3,249,935
RADAR TRACKING APPARATUS
Robert J. Follen, St. Anthony Village, Minn., assignor to Honeywell Inc., a corporation of Delaware
Filed Mar. 19, 1964, Ser. No. 353,189
6 Claims. (Cl. 343—7.3)

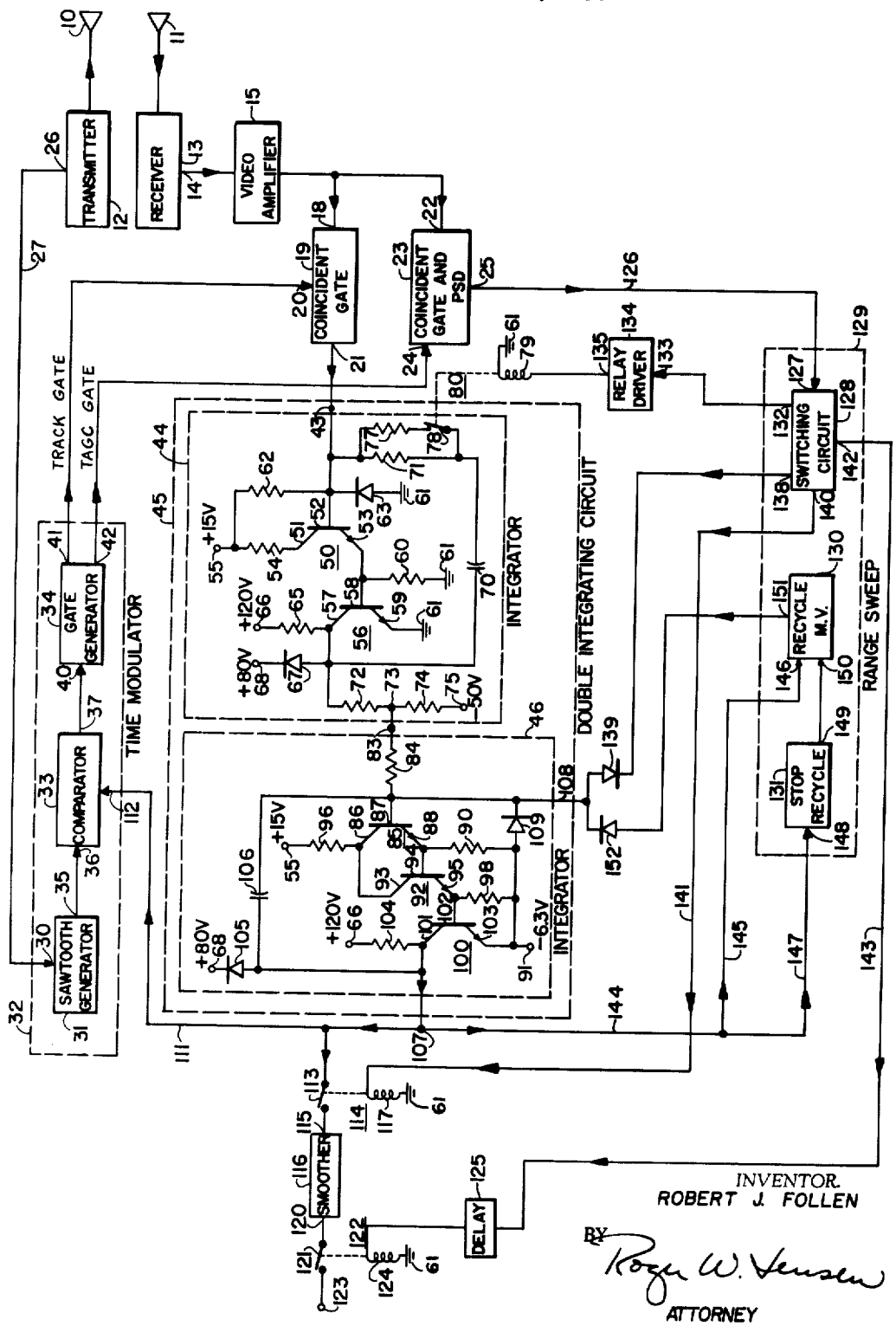

This invention pertains to pulse radar systems utilizing automatic target tracking and more particularly to improvements in the acquisition bandwidth and the initial track rate capability of automatic tracking radar altimeter systems.

With the advent of supersonic aircraft it has become imperative that pulse radar altimeter systems have a broad acquisition bandwith and a high initial track rate capabilty since the increased climbing rate of the aircraft as well as any rapidly changing characteristics of the earth's surface below the craft produce sudden changes in the target rate. The initial track rate capability is defined as the track rate capability the instant a sudden relatively large change in the target rate is introduced into the radar tracking loop. At the same time it is desirable that the radar tracking loop have a relatively low tracking loop bandwidth in order to minimize undesired noise effects. However, the low tracking loop bandwidth results in the tracking loop having a relatively low initial track rate capability.

The present invention provides a radar altimeter system which operates with a relatively low loop bandwidth during normal tracking conditions but which automatically broadens its acquisition bandwidth in the event of a sudden change in target rate as a result of a sudden change in aircraft altitude or terrain characteristics. The acquisition bandwidth is the tracking loop bandwidth at the time of acquisition of a target.

The invention comprises an automatic tracking loop which includes a sawtooth generator that is energized by a timing pulse generated in synchronism with a transmitted output pulse. The sawtooth generator produces a sawtooth, or ramp, output having a time duration which is a function of range or altitude. The sawtooth signal is applied to a comparator where it is compared with the output of a double integrator.

The double integrator comprises a first, or altitude rate, integrator which has its output connected to the input of a second, altitude integrator. The output of the altitude integrator is connected to the comparator.

When the output of the double integrator and the instantaneous value of the sawtooth signal are equal a pulse is generated at the output of the comparator which is applied to the input of a gate generator. The gate generator produces two output gates in response to the pulse output of the comparator. The first output gate of the gate generator is called the track gate and the second gate is called the track automatic gain control gate (TAGC). The track gate enables a coincident gate circuit while the TAGC gate enables a coincident gate and peak sensing detector circuit.

When a reflected transmitted pulse, which in the case of a radar altimeter has reflected from the ground below the aircraft, is received by the receiver antenna it is applied to a receiver which produces a video pulse output. This video pulse is amplified and applied to the inputs of the coincident gate circuit and the coincident gate and peak sensing detector circuit. The output of the coincident gate circuit is applied to the input of the altitude rate integrator in the double integrating circuit. The output of the coincident gate circuit is a current which is proportional to the area of coincidence between the video pulse and the track gate.

The altitude rate integrator comprises a high gain amplifier having an input and an output and further having a capacitance and resistance connected in series feedback from the output to the input of the amplifier. The altitude rate integrator has a predetermined positive offset current flowing into its input which is exactly cancelled or balanced by a negative current from the output of the coincident gate circuit when the track gate and the video pulse are in coincidence to a proper degree. In one mode of altimeter operation the track gate is coincident with the leading edge of the video pulse. During this time the positive offset current into the input of the altitude rate integrator is exactly cancelled by the output of the coincident gate circuit. If the track gate is not tracking enough of the leading edge of the video pulse the output of the coincident gate circuit is too small and there is a net positive input current into the rate integrator. Similarly, if the track gate is tracking too much of the video pulse the output current of the coincident gate circuit is too large and there is a net negative current into the input of the rate integrator.

If the aircraft's altitude changes suddenly, either because the aircraft is climbing or diving or because of a sudden terrain change such as a canyon or a mountain, the altitude video pulse occurs either earlier or later in time, depending upon whether the altitude has decreased or increased. In ether case the track gate must move suddenly in time so as to remain coincident with the video pulse. The rate at which the track gate can move in time is called the track rate capability (TRC) and is equal to $$E_1 \times \frac{K}{T_2}$$

where $E_1$ is the output voltage of the altitude rate integrator, K is the slope of the sawtooth signal and $T_2$ is the time constant of the altitude integrator. If K, the slope of the sawtooth signal, and $T_2$, the time constant of the altitude integrator, are both constant then it can be seen from the above relationship that the track rate capability is dependent upon the output $E_1$ of the altitude rate integrator, and is a maximum when the output of the altitude rate integrator is a maximum. However, at the initial loss of coincidence between the track gate and the video pulse, the output of the altitude rate integrator does not immediately reach its maximum output but rather there is a time delay caused by the fact that the feedback capacitor must charge. Therefore, the initial output voltage of the rate integrator equals the integrator input current times the magnitude of the integrator feedback resistance. The initial track rate capability is determined by the initial output voltage of the altitude rate integrator. It is at the instant of initial loss of coincidence between the track gate and the video pulse that it is desirable for the altimeter to have its maximum track rate capability.

One way of increasing the altimeter's initial track rate capability would be to increase the magnitude of the rate integrator's feedback resistance. Since the initial output voltage of the altitude rate integrator is equal to the initial input current, which is substantially constant, times the magnitude of the integrator feedback resistance, the initial output voltage can be increased by increasing the magnitude of this feedback resistance. However, increasing the size of the feedback resistance causing the track loop bandwidth to increase also increases the noise and other undesirable effects.

In the present invention, the magnitude of the feedback resistance of the altitude rate integrator is increased upon the initial loss of coincidence between the track gate and the video pulse, and is maintained in this increased condition until the feedback capacitor has had time to charge, at which time the magnitude of the integrator feedback resistance is returned to its normal value. In this manner the present invention obtains both the benefit of a high initial track rate capability and also a relatively low track loop bandwidth during tracking operation.

It is one object of this invention, therefore, to provide an improved pulse radar system utilizing automatic target tracking.

Another object of this invention is to provide an automatic tracking radar altimeter system having an improved acquisition bandwidth and initial track rate capability.

These and other objects of my invention will become apparent to those skilled in the art upon consideration of the accompanying specification, claims, and drawing, of which:

The single figure shows a schematic representation of the present invention.

Structure

Referring to the figure there is shown a transmitter antenna 10 and a receiver antenna 11. Transmitter antenna 10 is connected to the output of transmitter 12, and receiver antenna 11 is connected to the input of a receiver 13. A video output 14 of receiver 13 is connected through a video amplifier 15 to an input 18 of a coincident gate circuit 19 and to an input 22 of a coincident gate and peak sensing detector circuit 23. Coincident gate circuit 19 has further an enabling input 20 and an output 21, and coincident gate and peak sensing detector circuit 23 has an enabling input 24 and an output 25.

A timing output 26 of transmitter 12 is connected by means of a conductor 27 to an input 30 of a sawtooth generator 31 of a time modulator 32. Time modulator 32 further includes a comparator 33 and a gate generator 34. An output 35 of sawtooth generator 31 is connected to a first input 36 of comparator 33, and an output 37 of comparator 33 is connected to an input 40 of gate generator 34.

A first output 41 of gate generator 34 is connected to the enabling input 20 of coincident gate circuit 19, and a second output 42 of gate generator 34 is connected to the enabling input 24 of coincident gate and peak sensing detector circuit 23. The output 21 of coincident gate circuit 19 is connected to an input 43 of a first integrator 44 of double integrator 45. Double integrator 45 further includes a second integrator 46.

Input 43 of integrator 44 is connected directly to a base 52 of a transistor 50. Transistor 50 further has a collector 51 and an emitter 53. Collector 51 of transistor 50 is connected by means of a resistor 54 to a positive 15-volt potential source 55, and emitter 53 of transistor 50 is connected directly to a base 58 of a transistor 56, and by means of a resistor 60 to ground 61. The base 52 of transistor 50 is connected by means of a resistor 62 to the potential source 55 and by means of a reverse poled diode 63 to ground 61.

Transistor 56 has collector 57 which is connected by means of a resistor 65 to a positive 120-volt potential source 66, and by means of a diode 67 to a positive 80-volt potential source 68. Transistor 56 also has an emitter 59 which is connected directly to ground 61. Collector 57 of transistor 56 is further connected by means of a feedback capacitor 70 in series with a feedback resistor 71 to the base 52 of transistor 50, and by means of a resistor 72 to an output terminal 73 of integrator 44. Output terminal 73 is connected by means of a resistor 74 to a negative 50-volt potential source 75.

A resistor 77 is connected in series with a normally closed relay contact 78 directly across feedback resistor 71. Relay contact 78 is energized by a relay winding 79 of a relay 80.

Output 73 of integrator 44 is connected to an input 83 of integrator 46. Input 83 of integrator 46 is connected by means of a resistor 84 to a base 87 of a transistor 85. Transistor 85 further has a collector 86 and an emitter 88. Emitter 88 of transistor 85 is connected by means of a resistor 90 to a negative 6.3-volt potential source 91, and is further directly connected to a base 94 of a transistor 92. Transistor 92 further has a collector 93 and an emitter 95. Collector 86 of transistor 85 is directly connected to collector 93 of transistor 92, and is further connected by means of a resistor 96 to the positive 15-volt potential source 55.

Emitter 95 of transistor 92 is connected by means of a resistor 98 to the negative 6.3 potential source 91 and is further connected to a base 102 of transistor 100. Transistor 100 further has a collector 101 and an emitter 103. Emitter 103 of transistor 100 is connected directly to the negative 6.3 potential source 91. Collector 101 of transistor 100 is connected by means of a resistor 104 to the positive 120-volt potential source 66, and by means of a diode 105 to the positive 80-volt potential source 68. Collector 101 is further connected by means of a capacitor 106 to the base 87 of transistor 85, and is further connected to an output terminal 107 of integrator 46. The base 87 of transistor 85 is connected to input terminal 108 which is connected to the negative 6.3 potential source 91 by a reverse poled diode 109.

Output 107 of integrator 46 is connected by means of a conductor 111 to a second input 112 of comparator 33. The loop just explained consisting of sawtooth generator 31, comparator 33, gate generator 34, coincident gate circuit 19, first integrator 44 and second integrator 46 is known as the track loop and is the tracking circuitry for the present apparatus. Output 107 of integrator 46 is further connected by means of a contact 113 of a relay 114 to an input 115 of a smoother circuit 116. Relay 114 further has a relay winding 117. An output 120 of smoother circuit 116 is connected by means of a relay contact 121 of a relay 122 to an altitude output terminal 123. Relay 122 further has a relay winding 124.

Output 25 of coincident gate and peak sensing detector circuit 23 is coupled by means of a conductor 126 to an input 127 of a switching circuit 128 which is a part of a range sweep unit 129. Range sweep unit 129 includes a recycle multivibrator 130 and a stop recycle circuit 131. A first output 132 of switching circuit 128 is connected to an input 133 of a relay driver circuit 134. An output 135 of relay driver 134 is connected through relay winding 79 of relay 80 to ground 61. An output 138 of switching circuit 128 is connected by means of a reverse poled diode 139 to the input 108 of integrator 46. An output 140 of switching circuit 128 is connected by means of a conductor 141 to one side of the relay winding 117 of relay 114, the other side is connected to ground 61. An output 142 of switching circuit 128 is connected by means of a conductor 143 to a delay circuit 125. The output of delay circuit 125 is connected to one side of the relay winding 124 of relay 122, the other side is connected to ground 61.

Output 107 of integrator 46 is connected by means of a conductor 144 and a conductor 145 to an input 146 of recycle multivibrator 130, and by means of conductor 144 and a conductor 147 to an input 148 of stop recycle circuit 131. An output 149 of stop recycle circuit 131 is connected to an input 150 of recycle multivibrator 130. An output 151 of recycle multivibrator 130 is connected by means of a diode 152 to the input 108 of integrator 46.

Operation

Transmitter 12 generates short pulse width pulses of RF energy which are applied to transmitter antenna 10 and are radiated toward the target, in this case ground. The reflected RF energy pulse is picked up by the receiver antenna 11 and is applied to receiver 13. Receiver 13 produces a video pulse signal at output 14 which is coupled through the video amplifier 15 to the inputs 18 and 22 of coincident gate circuit 19 and coincident gate and peak sensing detector circuit 23 respectively. Each time the transmitter produces a pulse a timing pulse appears at transmitter output terminal 26 and is coupled through conductor 27 to the input 30 of sawtooth generator 31. This timing pulse initiates the generation of a sawtooth signal which appears at the output 35 of sawtooth generator 31 and is coupled to the input 36 of comparator 33. The output appearing at terminal 107 of the double integrator 45 is coupled through conductor 111 to the input 112 of comparator 33. When the instantaneous magnitude of the sawtooth applied to comparator 33 is equal to the magnitude of the output of the double integrator 45 a signal appears at output terminal 37 of comparator 33 and is coupled to the input 40 of gate generator 34.

This input to gate generator 34 causes a first and a second gate to appear at the gate generator output terminals 41 and 42, respectively. The first gate output called the track gate, is coupled from output terminal 41 of gate generator 34 to the input terminal 20 of coincident gate circuit 19 while the second gate output called the track automatic gain control (TAGC) appears at output terminal 42 of gate generator 34 and is coupled to the input terminal 24 of coincident gate and peak sensing detector circuit 23. The trailing edge of the TAGC gate appearing at output terminal 42 of gate generator 34 is delayed in time by a predetermined amount with respect to the trailing edge of the track gate appearing at output terminal 41 of gate generator 34. The track gate input to terminal 20 of coincident gate circuit 19 enables the circuit 19 during the leading edge of the video pulse coupled to input 18 of circuit 19, and thereby allows an output signal proportional to the leading edge of the video signal to appear at output terminal 21 of circuit 19. The output signal from the coincident gate circuit 19 is coupled to the input 43 of integrator 44. This signal is integrated in integrator 44 and is coupled from the output 73 of integrator 44 to the input 83 of integrator 46. The signal at the output 73 of integrator 44 is proportional to the rate of the change of altitude. As mentioned previously, this signal is coupled to the input 83 of integrator 46 where it is integrated. Since the input to integrator 46 is proportional to the rate of change of altitude the output appearing at output 107 of integrator 46 is proportional to altitude. This signal is coupled through relay contact 113 to the input 115 of smoother circuit 116. The signal is then smoothed in the smoother circuit 116 and appears as a D.C. level at the output 120 of smoother circuit 116. The smoothed altitude signal is coupled through relay contact 121 to the altitude output terminal 123.

As mentioned previously, the altitude signal appearing at output terminal 107 of integrator 46 is also coupled through conductor 111 to input terminal 112 of comparator 33. The magnitude of the altitude signal determines at which point in time an output appears at the output of comparator 33 and, hence, the time at which gate generator 34 generates the track gate and TAGC gate.

The TAGC gate transmitted to the input 24 of the coincident gate and peak sensing detector circuit 23, from the output 42 of gate generator 34, enables that circuit. When the coincident gate and peak sensing detector circuit 23 is enabled the video signal at its input 22 is transmitted through the circuit and an output appears at output terminal 25 which is proportional to the peak amplitude of the video signal.

The output signal at terminal 25 of coincident gate and peak sensing detector circuit 23 is coupled by means of conductor 126 to the input 127 of switching circuit 128 thereby operating switching circuit 128 to its first state. When switching circuit 128 is in its first state an output appears at output terminal 140 and is coupled through conductor 141 to relay winding 117 of relay 114 energizing the winding and thereby closing relay contact 113. An output signal also appears at output 142 of switching circuit 128 and is coupled through conductor 143 and delay circuit 125 to winding 124 of relay 122 thereby energizing relay 122. When relay 122 is energized relay contact 121 is closed. As explained previously, when relay contact 113 is closed the altitude output of the double integrator 45 is connected to the input of smoother circuit 116 and when relay contact 121 is closed the output of smoother circuit 116, or in other words the altitude signal, is connected to the altitude output terminal 123.

Assume now that the track gate and the TAGC gate from the output of gate generator 34 lose track of the video pulse. In other words, assume that the track gate appearing at input 20 of coincident gate circuit 19 is not coincident with the video pulse applied to the input 18 of circuit 19, and similarly, the TAGC gate applied at input 24 of coincident gate and peak sensing detector circuit 23 is not coincident with the video pulse applied to input 22 of circuit 23. In this situation there is no output from either coincident gate circuit 19 or coincident gate and peak sensing detector circuit 23, and hence, it becomes necessary for the altimeter to switch over to a search mode so as to re-establish coincidence between the tracking gates and the video pulse.

The searching operation is accomplished as follows: when coincidence between the TAGC gate and the video pulse is lost, or when the output from the coincident gate and peak sensing detector circuit 23 drops below a predetermined value, the input to switching circuit 128 is insufficient to maintain switching circuit 128 in its first operating state and hence it switches to its second operating state.

When switching circuit 128 is in its second mode of operation a substantially step function signal appears at output terminal 138 of switching circuit 123 and is coupled through diode 139 to the input 108 of the second integrator 46. This substantially step function input signal to integrator 46 is integrated and sweeps the output signal of integrator 46 to its positive limit. The output 107 of integrator 46 is coupled through conductor 144 and conductor 145 to the input 146 of recycle multivibrator 130. When the output signal of integrator 46 reaches its positive limit, recycle multivibrator 130 changes state and a substantially step function output signal appears at recycle multivibrator output 151. This signal is coupled through diode 152 to the input 108 of integrator 46. This substantially step function is of an opposite polarity to the step function output signal of switching circuit 128, and hence this signal is integrated in integrator 46 and sweeps the output signal of integrator 46 to its negative limit. The output 107 of integrator 46 is connected by means of conductor 144 and conductor 147 to the input 148 of the stop recycle circuit 131. As the output signal of integrator 46 reaches its negative limit a signal appears at output 149 of stop recycle circuit 131 and is coupled to input 150 of recycle multivibrator 130. When recycle multivibrator 130 is reset the step function output signal disappears from recycle multivibrator output 151 and the step function output signal from switching circuit 128 again controls the operation of the integrator 46 and tends to sweep the output signal of the integrator to its positive limit once more.

As the output signal of double integrator 45 sweeps over its range from the positive limit to the negative limit the point at which the instantaneous magnitude of the sawtooth wave form applied to input 36 of comparator 33 equals the magnitude of the output signal of double integrator 45 applied to input 112 of comparator 33 varies and, hence, the time at which the output signal appears on output terminal 37 of comparator 33 also varies. Since the output signal of comparator 33 controls the time at which the gate generator 34 generates the track gate and the TAGC gate the times of these gates also vary and these gates are effectively swept continuously up and back through substantially the limit of the altimeter range. At some point during the search operation the track gate and the TAGC gate intercept the video pulse from the output of video amplifier 15. At this time the track gate applied to terminal 20 of coincident gate circuit 19 is coincident with the video pulse supplied to input 18 of coincident gate circuit 19 and, hence, an output signal appears at output terminal 21. Similarly, the TAGC gate applied to terminal 24 of the coincident gate and peak sensing detector circuit 23 is coincident with the video pulse applied to input terminal 22 and, hence, an output signal once again appears at output terminal 25. As explained previously, the output signal on terminal 25 of coincident gate and peak sensing detector circuit 23 switches switching circuit 128 to its first mode of operation and the altimeter returns to the track mode.

When the altimeter changes from its track mode of operation to its search mode of operation, and switching circuit 128 changes from its first mode to its second mode of operation, the output signal at output terminal 140 of switching circuit 128, which energizes relay winding 117 of relay 114, is not immediately removed but rather there is a short time delay before relay winding 117 is de-energized. The purpose of this short time delay is to prevent the smoother from being disconnected from the output 107 of the double integrator 45 in the event that there is a momentary loss of coincidence between the track gate and the TAGC gate and the video signal. Similarly, when switching circuit 128 changes from its first mode of operation to its second mode of operation and the output signal at output terminal 142 of switching circuit 128 disappears, delay circuit 125 prevents the immediate de-energization of relay winding 124 of relay 122. The delay of delay circuit 125 which inhibits the de-energization of relay winding 124 is substantially longer than the delay in switching circuit 128 which inhibits the de-energization of relay winding 117.

Smoother circuit 116 contains a memory and, hence, this circuit remembers the aircraft's altitude at the moment that relay winding 117 is de-energized and relay contact 113 is opened thereby disconnecting smoother circuit 116 from the output of the double range integrator 45. If the searching circuits are unable to re-establish coincidence between the video signal and the track gate and the TAGC gate during the delay time of delay circuit 125 then relay winding 124 is de-energized and relay contact 121 opens, thereby removing the altitude signal from the altitude output terminal 123. As soon as coincidence is re-established between the video pulse and track gate and TAGC gate, relay windings 117 and 124 are again energized and the altitude indicator indicates the present altitude.

When the altimeter is in its track mode of operation the track gate and the TAGC gate, produced by the gate generator 34 and applied to the coincident gate circuit 19 and the coincident gate and peak sensing detector circuit 23, respectively, must track, or follow, the video pulse produced by the video amplifier. If a sudden change in the time of return of the video pulse should occur, due to a sudden change in the altitude, there must be a rapid change in the time of coincidence between these gates and the video pulse in the coincident gate circuit 19 and the coincident gate and peak sensing detector circuit 23. If the time of generation of the track gate and TAGC gate cannot be changed rapidly enough to maintain coincidence between these gates and the video pulse, the coincident gate circuit 19 and the coincident gate and peak sensing detector circuit 23 lose coincidence and the switching circuit 128 switches to the search mode because of a lack of signal at the input 127. The time required for the tracking loop to generate the track gate and the TAGC gate is directly dependent upon the acquisition bandwidth of the tracking loop. The acquisition bandwidth of the tracking loop is maintained relatively narrow during normal operation to reduce the effect of noise in the system. Because the acquisition bandwidth is normally narrow the tracking loop does not have the ability to change its tracking rate suddenly. That is, when the rate of the video pulse suddenly changes the initial track rate capability of the tracking loop is low and coincidence between the track and the TAGC gate and the video pulse may be lost. Thus, so that the system is not continually switching from the track mode to the search mode the present invention increases the initial track rate capability. The track rate capability is equal to $$E_1 \times \frac{K}{T_2}$$

where $E_1$ is the output signal of the altitude rate integrator 44 at the output 73, K is the slope of the sawtooth signal produced at the output 35 of the sawtooth generator 31 and $T_2$ is the time constant of the altitude integrator 46. Both K and $T_2$ are held constant in the present circuitry while $E_1$ is increased to increase the track rate capability.

Immediately upon losing the proper amount of coincidence in coincident gate circuit 19 a net current flows into integrator 44. Since the initial current flowing into the integrator 44 flows in the feedback circuit to change the value to which capacitor 70 is charged, $E_1$, the output voltage of the altitude rate integrator 44, is initially equal to the input current of the integrator 44 times the magnitude of the integrator feedback resistance. Thus the initial track rate capability of the altimeter is increased by initially increasing the value of the integrator feedback resistance.

The feedback resistance of the integrator 44 is increased initially to provide an immediate maximum track rate capability in the following manner. The output 132 of switching circuit 128 provides a signal which is coupled to the input 133 of relay driver 134. Relay driver 134 in turn provides a signal at output 135 which energizes winding 79 of relay 80. When relay winding 79 is energized contact 78 of relay 80, which is normally closed, is opened and a resistor 77, which is normally in parallel with feedback resistor 71, is disconnected from the circuit. The value of resistor 71 is large relative to the parallel combination of resistor 71 and 77. The combination of resistor 77 in parallel with feedback resistor 71 provides a feedback resistance which gives the tracking loop the normal acquisition bandwidth.

If the video pulse from the video amplifier 15 changes its time of return at a normal rate the normal acquisition bandwidth of the tracking loop is sufficient to maintain coincidence in the coincident gate circuit 19 and the coincident gate and peak sensing detector circuit 23. However, when the video pulse changes its time of return suddenly, the normal acquisition bandwidth and the initial track rate capability of the tracking loop is not sufficient to maintain coincidence in the coincident gate circuit 19 and the coincident gate and peak sensing detector circuit 23. Thus the signal at input 127 of switching circuit 128 is lost and switching circuit 128 switches into the search mode of operation.

When the switching circuit 128 switches to its search mode of operation a signal is prevalent at the output 132 and the relay driver 134 energizes the relay winding 79. Since relay winding 79 is energized, contact 78 of relay 80 opens and the resistor 77 is disconnected so it is no longer in parallel with the feedback resistor 71. By disconnecting the parallel resistance 77 the total feedback resistance of the integrator 44 is greatly increased and, therefore, the output voltage $E_1$ at output 83 is increased to its maximum value. As previously mentioned when $E_1$, the output voltage of the integrator 44, is increased the acquisition bandwidth of the tracking loop is increased. Thus, immediately upon losing the signal at the input 127 of switching circuit 128 relay contact 78 of relay 80 opens removing resistor 77 from the parallel circuit greatly increasing the feedback resistance of the integrator 44 and, thereby, increasing the initial track rate capability of the tracking loop to its maximum value.

As previously explained, the switching circuit 128 has a delay therein which maintains the output signal on output 140 for some time after the input signal at input 127 is removed. Thus, when coincidence between the track gate and TAGC gate and the video pulse is lost because of a sudden change in the time of return of the video pulse the switching circuit 128 immediately causes the value of the feedback resistance in the integrator circuit 44 to be increased so that the initial track rate capability is increased to its maximum value and coincidence can be regained before the output signal at output 140 of switching circuit 128 is lost.

Once the output signal at the output 132 of switching circuit 128 is applied to the relay driver 134, the relay winding 79 is energized, opening the relay contact 78 and removing the resistor 77 from the circuit. The relay winding 79 and the relay driver 134 have a built-in time delay so that the relay winding 79 only remains energized for a preselected period of time. This preselected period of time is approximately equal to the time required for capacitor 70 to charge to its maximum value through the resistor 71. Once the capacitor 70 is charged to its maximum value current no longer flows into the capacitor 70 and the output voltage, $E_1$, is at its maximum value and therefore, the track rate capability of the tracking loop is at its maximum value. The relay winding 79 is then automatically de-energized and relay contact 78 closes placing resistor 77 back in parallel with the feedback resistor 71.

Thus in the present apparatus immediately upon the video return pulse changing in return time so suddenly that the track gate and the TAGC gate cannot remain in coincidence therewith, the output 132 of circuit 128 energizes driver 134, which actuates relay 80 causing the feedback resistance in the integrator 44 to be increased, thereby increasing the initial track rate capability of the tracking loop to its maximum value. The increase in the track rate capability causes the track gate and the TAGC gate to overtake the rapidly changing video pulse thereby again providing coincident signals from the coincident circuit 19 and the coincident gate and peak sensing detector circuit 23. In general coincidence can be obtained before the output from the switching circuit 128 on output 140 is lost. Therefore, the momentary loss of coincidence at the coincident gate circuit 19 and coincident gate and peak sensing detector circuit 23 have no effect at the smoother circuit 116. Also, the tracking loop is not noticeably affected by the broadening of the acquisition bandwidth since the value of the feedback resistance of the first integrator 44 is only increased for a short time while the feedback capacitor 70 is charging. After the feedback capacitor is charged to its maximum value, the tracking loop is at its maximum track rate capability regardless of the value of the feedback resistance in the first integrator 44, and therefore, the value of the feedback resistance is again reduced to its normal value by placing resistor 77 in parallel with feedback resistor 71. Thus, the loop bandwidth is again returned to its normal width.

While I have shown and described a specific embodiment of this invention, the invention should not be limited to the particular form shown and I intend in the appended claims to cover all modifications which do not depart from the spirit and scope of this invention.

I claim:
1. A radar altimeter comprising:
   a track loop for tracking targets, said track loop having a relatively narrow acquisition bandwidth, and including a rate integrator comprising in combination;
   (a) a high gain amplifier having an input and an output,
   (b) impedance means, and
   (c) means connecting said impedance means to said amplifier to provide a feedback from the output to the input of said amplifier; and
   means connected to increase the effective impedance of said impedance means in the event of a sudden change in a target rate.

2. A radar altimeter comprising:
   a track loop for tracking targets, said track loop having a relatively narrow acquisition bandwidth, and including a rate integrator comprising in combination:
   (a) a high gain amplifier having an input and an output,
   (b) a capacitor,
   (c) a resistor, and
   (d) means connecting said resistor and said capacitor to said amplifier to provide a series feedback from the output to the input of said amplifier; and
   means connected to increase the effective resistance of said resistor in the event of a sudden change in a target rate.

3. An altimeter comprising:
   transmitter means for transmitting a radio frequency energy pulse to a reflecting object;
   receiver means for receiving said energy pulse after said pulse has reflected from said object, said receiver including means for amplifying the reflected pulse and producing a video output pulse;
   a track loop having a narrow acquisition bandwidth and a corresponding initial low track rate capability and comprising in combination;
   (a) sawtooth generating means energized in synchronism with the output of said transmitter means,
   (b) comparator means,
   (c) means connecting the output of said sawtooth generating means to said comparator means,
   (d) first and second integrating means,
   (e) means connecting the output of said first integrating means to the input of said second integrating means, the output of said second integrating means being connected to said comparator means,
   (f) gate generating means,
   (g) means connecting the output of said comparator means to said gate generating means,
   (h) coincident gate means,
   (i) means connecting said coincident gate means to the receiver video pulse output and said coincident gate means further having an enabling input,
   (j) means connecting the output of said gate generating means to said enabling input of said coincident gate means so as to enable said coincident gate means during the period of the receiver video pulse output, and
   (k) means connecting the output of said coincident gate means to the input of said first integrating means; and
   means connected to said first integrating means to force the output of said first integrating means to a maximum in the event the time position of said video pulse varies at a rate faster than said initial low track rate capability.

4. Altimeter comprising:
   transmitter means for transmitting a radio frequency energy pulse to a reflecting object;
   receiver means for receiving said energy pulse after said pulse has reflected from said object, said receiver in-including means for amplifying the reflected pulse and producing a video output pulse;
   a track loop having a narrow acquisition bandwidth and comprising in combination;
   (a) sawtooth generator means energized in synchronism with the output of said transmitting means,
   (b) comparator means,
   (c) means connecting the output of said sawtooth generator means to said comparator means, (d) first integrating means comprising a high gain amplifier having an input and an output and an impedance connected to provide a feedback circuit from said output to said input of said amplifier,
(e) second integrating means,
(f) means connecting the output of said first integrating means to the input of said second integrating means the output of said second integrating means being connected to said comparator means,
(g) gate generating means,
(h) means connecting the output of said comparator means to said gate generating means,
(i) coincident gate means,
(j) means connecting said coincident gate means to the receiver video pulse output, said coincident gate means further having an enabling input,
(k) means connecting the output of said gate generating means to said enabling input of said coincident gate means so as to enable said coincident gate means during the period of the receiver video pulse output, and
(l) means connecting the output of said coincident gate means to the input of said first integrating means; and means connected to said first integrating means to increase said impedance of said first integrating means thereby increasing the acquisition bandwidth of said track loop in the event the time position of said video pulse suddenly varies a relatively large amount.

5. A distance measuring device comprising:
time modulator means responsive to a first signal and operable so as to produce a first gate output and a second gate output a known time after the occurrence of said first signal;
first coincident gate means connected so as to receive a second signal;
means connecting the first gate output from said time modulator means to said first coincident gate means whereby said first coincident gate means produces an output signal proportional to the coincidence between said first gate output and said second signal;
a distance integrating means having an input and an output;
a distance rate integrating means comprising in combination;
  (a) high gain amplifier having an input and an output,
  (b) a capacitance means,
  (c) a first resistance means,
  (d) means connecting said first resistance means and said capacitance means to provide a series feedback from the output to the input of said amplifier,
  (e) a second resistance means, and,
  (f) normally closed relay means connecting said second resistance means in parallel with said first resistance means;
means connecting the output of said distance rate integrating means to the input of said distance integrating means;
means connecting the input of said distance rate integrating means so as to receive the output signal from said first coincident gate means;
means connecting the output of said distance integrating means to said time modulator means, the output of said distance integrating means controlling the position of said first and second gates whereby the first and second gates are repositioned to follow any changes in the time between the occurence of said first signal and the occurence of said second signal;
second coincident gate means;
means connecting the second gate output from said time modulator means to said second coincident gate means whereby said second coincident gate means produces an output signal proportional to the magnitude of said second signal when said second gate output and said second signal are time coincident; and
means responsive to the output of said second coincident gate means to energize said relay when said second gate output and said second signal are out of coincidence, the energization of said relay means acting to remove said second resistance means from in parallel with said first resistance means.

6. A distance measuring device comprising:
time modulator means responsive to a first signal and operable so as to produce a first gate output and a second gate output a known time after the occurrence of said first signal;
first coincident gate means connected so as to receive a second signal;
means connecting the first gate output from said time modulator means to said first coincident gate means whereby said first coincident gate means produce an output signal proportional to the coincidence between said first gate signal and said second signal;
a distance integrating means having an input and an output;
a distance rate integrating means comprising in combination;
  (a) a high gain amplifier having an input and an output,
  (b) impedance means,
  (c) means connecting said impedance means to provide a feedback from the output to the input of said amplifier,
  (d) second impedance means, and
  (e) normally closed relay means connecting said second impedance means to said first impedance means in a manner to decrease the total impedance thereof;
means connecting the output of said distance rate integrating means to the input of said distance integrating means;
means connecting the input of said distance rate integrating means so as to receive the output signal from said first coincident gate means;
means connecting the output of said distance integrating means to said time modulator means, the output of said distance integrating means controlling the position of said first and second gates whereby the first and second gates are repositioned to follow any changes in the time between the occurrence of said first signal and the occurrence of said second signal;
second coincident gate means;
means connecting the second gate output from said time modulator means to said second coincident gate means whereby said second coincident gate means produces an output signal proportional to the magnitude of said second signal when said second gate output and said second signal are time coincident; and
means responsive to the output of said second coincident gate means to energize said relay when said second gate output and said second signal are out of coincidence, the energization of said relay means acting to disconnect said second impedance means from said first impedance means.

References Cited by the Examiner
UNITED STATES PATENTS
3,078,457  2/1963  Himler et al. _____ 343—7.3

CHESTER L. JUSTUS, *Primary Examiner.*

LEWIS H. MYERS, *Examiner.*

T. H. TUBBESING, *Assistant Examiner.*